US009398447B2

(12) United States Patent
Ligeret

(10) Patent No.: US 9,398,447 B2
(45) Date of Patent: Jul. 19, 2016

(54) MOBILE TERMINATING NETWORK FAILURE FORWARDING FOR LTE CIRCUIT-SWITCHED FALLBACK

(71) Applicant: T-Mobile USA, Inc., Bellevue, WA (US)

(72) Inventor: Xavier Ligeret, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/224,044

(22) Filed: Mar. 24, 2014

(65) Prior Publication Data

US 2015/0271711 A1    Sep. 24, 2015

(51) Int. Cl.
*H04W 8/30*   (2009.01)
*H04W 36/00*  (2009.01)
*H04W 40/36*  (2009.01)

(52) U.S. Cl.
CPC ........... *H04W 8/30* (2013.01); *H04W 36/0022* (2013.01); *H04W 40/36* (2013.01)

(58) Field of Classification Search
CPC . H04W 8/30; H04W 36/022; H04W 36/0022; H04W 76/27; H04W 40/36; H04W 76/027; H04W 76/041; H04W 68/02; H04W 4/025; H04W 40/02; H04W 68/005; H04W 68/12; H04W 76/026; H04W 68/00; H04L 12/66
USPC ............. 370/242, 328; 455/458, 456.1, 432.1
See application file for complete search history.

(56) References Cited

U.S. PATENT DOCUMENTS

| | | | |
|---|---|---|---|
| 2009/0082023 A1* | 3/2009 | Gustavsson | H04L 12/5695 455/445 |
| 2010/0331011 A1* | 12/2010 | Vikberg et al. | 455/456.1 |
| 2012/0069731 A1 | 3/2012 | Tooher et al. | |
| 2012/0077498 A1* | 3/2012 | Guo | H04W 8/26 455/435.1 |
| 2012/0282937 A1* | 11/2012 | He | H04W 8/26 455/450 |
| 2012/0302234 A1 | 11/2012 | Wallis et al. | |
| 2013/0210466 A1* | 8/2013 | Arvidsson et al. | 455/458 |
| 2013/0217423 A1* | 8/2013 | He | H04W 24/04 455/458 |
| 2013/0237213 A1* | 9/2013 | Tian et al. | 455/432.1 |
| 2013/0259001 A1* | 10/2013 | Keller et al. | 370/331 |
| 2013/0265884 A1* | 10/2013 | Brombal et al. | 370/242 |

(Continued)

OTHER PUBLICATIONS

"International Search Report and Written Opinion" for PCT/US2015/018027, mailed May 27, 2015, 12 pages.

(Continued)

*Primary Examiner* — Magdi Elhag
(74) *Attorney, Agent, or Firm* — Han Santos Reich, PLLC; Elliott Y. Chen

(57) ABSTRACT

Techniques pertaining to mobile terminating network failure forwarding for LTE circuit-switched fallback (CSFB) are described. In one aspect, a method includes a first telecommunications device of a pool of telecommunications devices receiving a reply message from a mobile user device forwarded to the first telecommunications device by a radio access device. The reply message is provided by the mobile user device in response to the mobile user device receiving a request message from a second telecommunications device of the pool of telecommunications devices. The method also includes the first telecommunications device establishing a voice call for the mobile user device based at least in part on information in the reply message.

20 Claims, 4 Drawing Sheets

(56) References Cited

U.S. PATENT DOCUMENTS

| | | |
|---|---|---|
| 2013/0288671 A1 | 10/2013 | Keller et al. |
| 2014/0051443 A1 | 2/2014 | Diachina et al. |
| 2014/0204905 A1* | 7/2014 | Ranke ............... H04W 36/0022 370/331 |
| 2015/0017980 A1* | 1/2015 | Chu .................... H04W 76/027 455/433 |

OTHER PUBLICATIONS

Qualcomm, "Circuit-switched fallback. The first phase of voice evolution for mobile LTE devices.", from << https://www.qualcomm.com/media/documents/files/circuit-switched-fallback-the-first-phase-of-voice-evolution-for-mobile-lte-devices.pdf >>, Dec. 31, 2012, 11 pages.

* cited by examiner

MOBILE TERMINATING NETWORK FAILURE FORWARDING FOR LTE CIRCUIT-SWITCHED FALLBACK

BACKGROUND

With continuous development and advancement in mobile telecommunications technologies, mobile telecommunications networks in operation providing mobile telecommunications services tend to include a mixture of legacy equipment and new equipment that implement legacy standards/protocols and new standards/protocols, respectively. For example, a mobile telecommunications network operated by a given service provider at present day typically includes equipment that implement legacy standards and protocols, such as $2^{nd}$ Generation (2G), e.g., Global System for Mobile Communications (GSM), and/or $3^{rd}$ Generation (3G), e.g., Universal Mobile Telecommunications System (UMTS), standards and protocols, as well as equipment that implement the latest standards and protocols, such as $4^{th}$ Generation (4G) including Long Term Evolution (LTE) and/or Mobile WiMax, standards and protocols. That is, a present-day mobile telecommunications network is likely to include one or more 4G networks, one or more 3G networks and/or one or more 2G networks.

In a 4G network, System Architecture Evolution (SAE) is the core network architecture of LTE wireless communication standard, and data communication of $3^{rd}$ Generation Partnership Project (3GPP) in SAE is packet-based. It does not have a circuit-switched domain, which is traditionally used for phone calls and Short Message Service (SMS). Circuit-switched fallback (CSFB) is a feature specified in 3GPP that allows a mobile user device (referred to as user equipment (UE) in the context of 4G/3G and mobile subscriber (MS) in the context of 2G) to change its radio access technology from LTE to a 2G/3G technology which supports circuit-switched services, in order for the mobile user device to make and receive calls.

However, when the connectivity between a pooled 3G radio network controller (RNC) (or 2G base station center (BSC)) and a pooled mobile switching center (MSC) is lost, all LTE subscribers (i.e., users of affected mobile user devices) served by the affected RNC/BSC will not be able to receive calls until the connectivity is re-established. As a result, mobile terminating calls to LTE subscribers are lost and the LTE subscribers end up missing the calls. The 3GPP standards do not cover this situation and the mobile terminating calls to the LTE subscribers served by the RNC/BSC suffering a failed IuCS interface will fail and get redirected to the recipient's voice mail.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
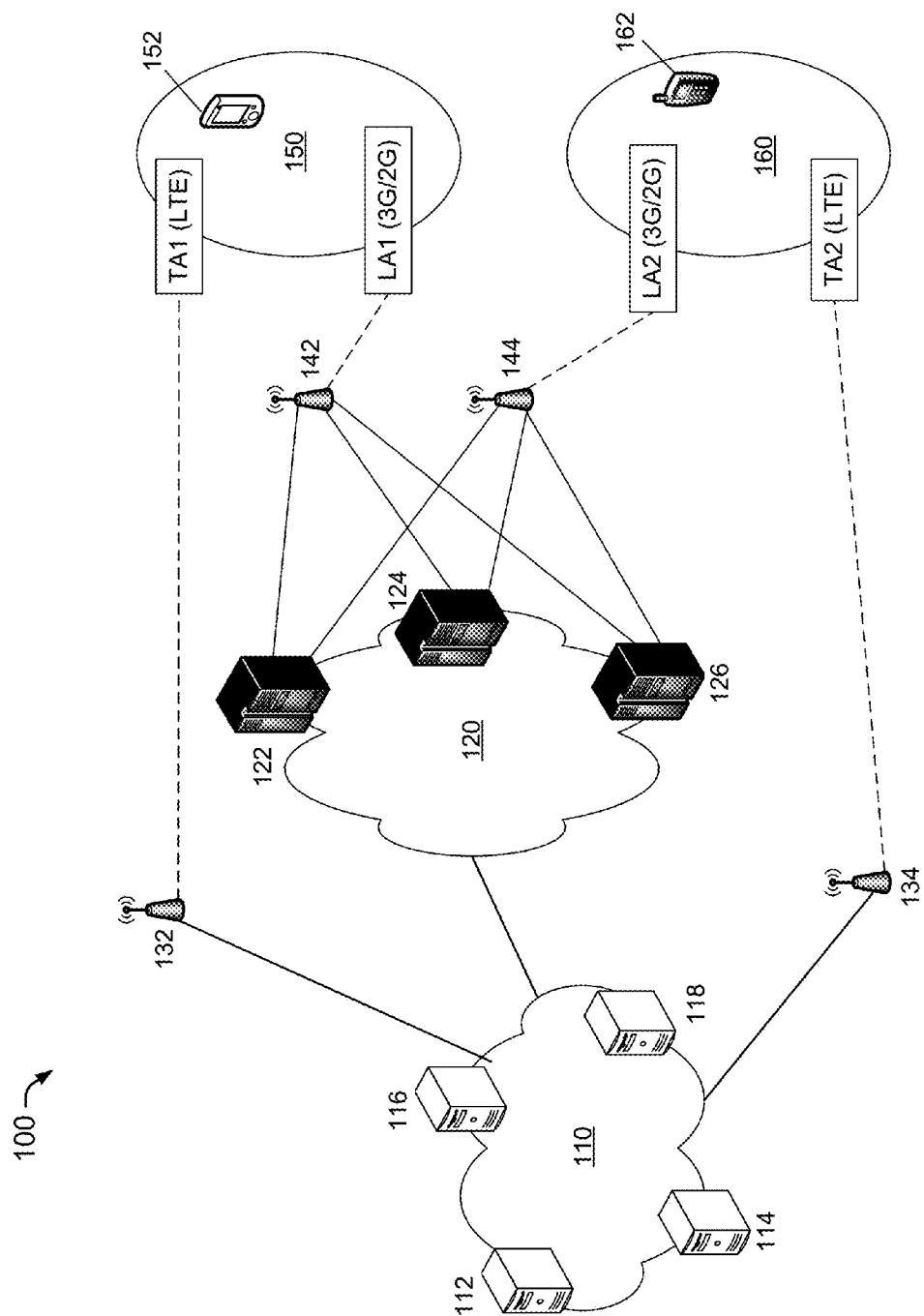
FIG. 1 illustrates an example mobile telecommunications network environment in which calls to and from LTE-capable mobile user devices are handled by CSFB between a LTE network and a UMTS/GSM network in accordance with embodiments of the present disclosure.

The present disclosure describes, in part, techniques implemented at a telecommunication device, e.g., MSC, to enable forwarding of mobile terminating calls for LTE CSFB when the connectivity between a RNC/BSC and a corresponding MSC is lost. Techniques of the present disclosure fill a gap left by the 3GPP standards and allow a mobile terminating call in such situation to be forwarded to another MSC which will take over the call setup. For example, under techniques of the present disclosure, one or more MSCs in a MSC pool other than the affected MSC will be able to take over the call setup for the mobile user device to which the mobile terminating call is directed. Techniques of the present disclosure do not introduce any new change that would deteriorate the behavior or performance of the existing LTE CSFB service, and do not require regression testing. Moreover, techniques of the present disclosure add a new call flow and have no known or major conflict with existing call flows defined by the 3GPP standards.

According to one aspect, a method of establishing a mobile terminating call in a mobile telecommunications network may include a first telecommunications device of a pool of telecommunications devices receiving a reply message from a mobile user device forwarded to the first telecommunications device by a radio access device. The reply message may be provided by the mobile user device in response to the mobile user device receiving a request message from a second telecommunications device of the pool of telecommunications devices. The method may also include the first telecommunications device establishing a voice call for the mobile user device based at least in part on information in the reply message.

In various embodiments, the first telecommunications device may receive the reply message from the mobile user device forwarded to the first telecommunications device by the radio access device in response to a failure in a connection between the radio access device and the second telecommunications device.

In various embodiments, the mobile user device may include a LTE-capable UE, the pool of telecommunications devices may include a pool of MSCs, and the radio access device may include a RNC of a UMTS network in the mobile telecommunications network or a BSC of a GSM network in the mobile telecommunications network. In some embodiments, the request message may include a paging request, the reply message may include a paging response, and the information in the reply message may include temporary mobile subscriber identity (TMSI).

In various embodiments, the first telecommunications device and the second communications device may support mobile terminating roaming forwarding (MTRF) in accordance with the 3GPP standards.

In various embodiments, the method may also include the first telecommunications device identifying other telecommunications devices in the pool based on network resource identifier (NRI) information in the reply message from the mobile user device.

In various embodiments, the method may also include the first telecommunications device performing a location update procedure with a home location register (HLR) associated with the first telecommunications device regarding the mobile user device.

In various embodiments, the method may also include the first telecommunications device, prior to establishing the voice call, transmitting an identity request to the mobile user device and receiving an identity response from the mobile user device.

According to another aspect, a mobile telecommunications network may include a LTE network, a pool of multiple MSCs, and a radio access device communicatively coupled to at least a first MSC and a second MSC of the pool of MSCs. In response to a failure in a connection between the radio access device and the second MSC, the radio access device may forward to the first MSC a reply message from a mobile user device in replying to a request message from the second MSC. The first MSC may receive the reply message and establish a voice call for the mobile user device based at least in part on information in the reply message.

In various embodiments, the radio access device may include a RNC of a UMTS network in the mobile telecommunications network or a BSC of a GSM network in the mobile telecommunications network. In some embodiments, the request message may include a paging request, the reply message may include a paging response, and the information in the reply message may include TMSI.

In various embodiments, the first MSC and the second MSC may support MTRF in accordance with the 3GPP standards.

In various embodiments, the first MSC may identify other MSCs in the pool based on NRI information in the reply message from the mobile user device.

In various embodiments, the first MSC may perform a location update procedure with a HLR associated with the first MSC regarding the mobile user device.

In various embodiments, the first MSC may, prior to establishing the voice call, transmit an identity request to the mobile user device and receive an identity response from the mobile user device.

According to yet another aspect, a telecommunications device may include memory configured to store at least a set of instructions and one or more processors coupled to the memory. The one or more processors may be configured to execute the set of instructions to perform operations. The operations may include receiving a reply message from a mobile user device forwarded to the telecommunications device by a radio access device. The reply message may be provided by the mobile user device in response to the mobile user device receiving a request message from another telecommunications device. The operations may also include establishing a voice call for the mobile user device based at least in part on information in the reply message.

In various embodiments, the request message may include a paging request, the reply message may include a paging response, and the information in the reply message may include TMSI.

In various embodiments, the one or more processors may also identify other telecommunications devices in a pool of telecommunications devices, with which the telecommunications device belongs, based on NRI information in the reply message from the mobile user device.

In various embodiments, the one or more processors may also perform a location update procedure with a HLR associated with the telecommunications device regarding the mobile user device.

In various embodiments, the one or more processors may also, prior to establishing the voice call, transmit an identity request to the mobile user device and receive an identity response from the mobile user device.

Techniques, methods, devices, systems and network architecture described herein may be implemented in a number of ways. Example implementations are provided below with reference to the following figures.

Example Network Architecture

FIG. 1 illustrates an example mobile telecommunications network environment 100 in which calls to and from LTE-capable mobile user devices (e.g., smart phones) are handled by CSFB between a LTE network and a UMTS/GSM network in accordance with embodiments of the present disclosure.

As shown in FIG. 1, example mobile telecommunications network environment 100 includes a mobility management entity (MME) pool 110 and multiple evolve Node-B ("eNodeB") 132, 134 of a LTE network. Example mobile telecommunications network environment 100 also includes an MSC pool 120 and multiple RNC (or BSC) 142, 144 of a UMTS (or GSM network). MME pool 110 includes a number of MMEs such as first MME 112, second MME 114, third MME 116 and fourth MME 118. MSC pool 120 includes a number of mobile switching centers/visited location registers (MSCs/VLRs). As the function of a VLR may be embedded in an associated/corresponding MSC, for simplicity the term "MSC" is used in place of "MSC/VLR" throughout the present disclosure. As shown in FIG. 1, MSC pool 120 includes first MSC 122, second MSC 124 and third MSC 126.

Those skilled in the art would appreciate that, although a certain number of network nodes and elements are illustrated in FIG. 1, techniques described herein also apply to alternative mobile telecommunications network environments having different numbers of network elements/nodes. Moreover, for simplicity and not to obscure better understanding of techniques of the present disclosure, certain network elements/nodes typically found in 4G/3G/2G networks are not illustrated in FIG. 1. Further, techniques described herein apply to LTE CSFB between a LTE network and a UMTS network as well as between a LTE network and a GSM network. Thus, description provided herein directed to a UMTS network is applicable to a GSM network, and vice versa.

Example mobile telecommunications network environment 100 further includes one or more LTE-capable mobile user devices such as mobile user devices 152, 162. That is, mobile user devices 152 and 162 are capable of wireless communication in accordance with LTE and 3G/2G radio access technologies. Mobile user device 152 is in a first tracking area TA1 served by eNodeB 132 and one of the MMEs of MME pool 110 (e.g., second MME 114) of the LTE network. Mobile user device 152 is also in a first location area LA1 served by RNC/BSC 142 and one of the MSCs of MSC pool 120 (e.g., first MSC 122) of the UMTS or GSM network. In FIG. 1, TA1/LA1 is denoted as service area 150. Mobile user device 162 is in a second tracking area TA2 served by eNodeB 134 and one of the MMEs of MME pool 110 (e.g., fourth MME 118) of the LTE network. Mobile user device 162 is also in a second location area LA2 served by RNC/BSC 144 and one of the MSCs of MSC pool 120 (e.g., second MSC 124) of the UMTS or GSM network. In FIG. 1, TA2/LA2 is denoted as service area 160.

Prior to implementation of techniques of the present disclosure in example mobile telecommunications network environment 100, mobile terminating calls to LTE subscribers in LA1/TA1, e.g., mobile user device 152, would fail if the IuCS interface between RNC/BSC 142 and first MSC 122 is down or failed until the IuCS interface is back up. The root cause of this problem comes from the nature of the LTE CSFB service and the architecture of the LTE, UMTS and GSM networks as specified by the 3GPP standards. In particular, second MME 114, which serves mobile user device 152, would not have visibility on the state of the IuCS interfaces (also referred to as the A interfaces) between RNC (or BSC) 142/144 and MSC 122, 124 and 126. Even if the IuCS interface between RNC/BSC 142 and first MSC 122 is down, second MME 114 could still have mobile user device 152 registered on first MSC 122, which suffers a failed IuCS interface with RNC/BSC 142.

In the event that a voice call for mobile user device 152 comes, the LTE CSFB feature would send mobile user device 152 from the LTE network back to the 3G (UMTS) or 2G (GSM) network, regardless of any possible issue or outage in the 3G or 2G network. Specifically, the CSFB mobile terminating call would start with a paging request message from first MSC 122 to second MME 114 over a SGs interface. Then, second MME 114 would relay the paging request message to mobile user device 152 through eNodeB 132. After reception of the paging request message, mobile user device 152 would leave the LTE network and enter the 3G (or 2G) network, and would send a paging response message to first MSC 122 through RNC/BSC 142. However, given that the IuCS interface between RNC/BSC 142 and first MSC 122 is down, that paging response message from mobile user device 152 would not reach first MSC 122. RNC/BSC 142 may send the paging response message to another MSC in MSC pool 120, but that MSC (e.g., second MSC 124 or third MSC 126) would not know what to do with the paging response message and would eventually discard it.

Techniques of the present disclosure do not introduce any new change that would deteriorate the behavior or performance of the existing LTE CSFB service, and do not require regression testing. Moreover, techniques of the present disclosure add a new call flow and have no known or major conflict with existing call flows defined by the 3GPP standards. In various embodiments, techniques of the present disclosure may be implemented in MSCs of UMTS and GSM networks (e.g., MSC pool 120).

Preferably, a number of prerequisites are satisfied in order for techniques of the present disclosure to operate. Firstly, a given MSC in which techniques of the present disclosure are implemented needs to be within a pool of MSCs (e.g., MSC pool 120). Secondly, the MSC in which techniques of the present disclosure are implemented is capable of identifying other MSCs in the pool using NRI information exchanged in some signaling messages over the IuCS interface. Thirdly, the RNC/BSC is pooled and connected to other MSCs of the MSC pool. Fourthly, the RNC/BSC is capable of forwarding the paging response message from the mobile user device to another MSC of the MSC pool when the IuCS interface between the RNC/BSC and the serving MSC is down. Lastly, MSCs of the MSC pool are configured to support the 3GPP MTRF feature.

The above-listed prerequisites ensure the serving MSC (e.g., first MSC 122 in the above example), which suffers a failed IuCS interface with its corresponding RNC/BSC (e.g., RNC/BSC 142 in the above example), can forward the mobile terminating voice call to another MSC of the MSC pool. The above-listed prerequisites also ensure that the RNC/BSC (e.g., RNC/BSC 142 in the above example) can forward the paging response message relevant to the voice call to that other MSC of the MSC pool.

Figure 2:
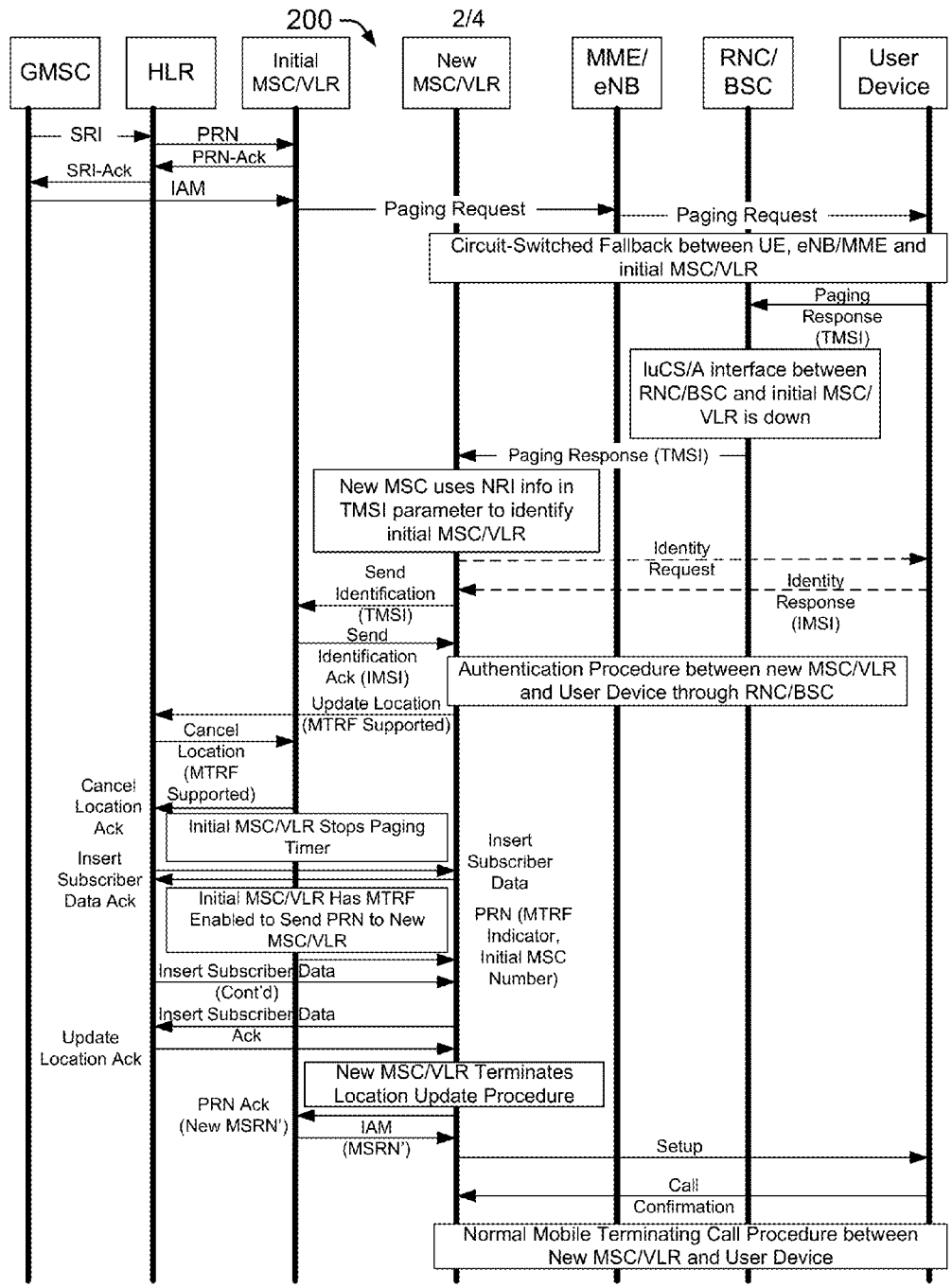
FIG. 2 illustrates an example call flow for mobile terminating network failure forwarding for LTE CSFB in accordance with an embodiment of the present disclosure.

FIG. 2 illustrates an example call flow 200 for mobile terminating network failure forwarding for LTE CSFB in accordance with an embodiment of the present disclosure. To aid better understanding of techniques of the present disclosure, the following description of example call flow 200 is provided with reference to example mobile telecommunications network environment 100 of FIG. 1. In the context of the example give about with respect to FIG. 1, call flow 200 pertains to a mobile terminating voice call directed to mobile user device 152, which is registered with first MSC 122 in the 3G/2G network.

Example call flow 200 starts with a gateway mobile switching center (GMSC) transmitting a send routing information (SRI) message to a home location register (HLR), which transmits a provide roaming number (PRN) message to an initial MSC (e.g., first MSC 122) of a MSC pool (e.g., MSC pool 120). Initial MSC responds to the HLR with a PRN acknowledge message, and the HLR responds to the GMSC with a SRI acknowledgement message. The GMSC then transmits an initial address message (IAM) to the initial MSC, which transmits a paging request message to the MME with which the mobile user device is registered in the LTE network (e.g., second MME 114). The MME (e.g., MME 114) transmits the paging request message to the mobile user device (e.g., mobile user device 152). At this point, the CSFB procedure between the mobile user device, corresponding eNodeB, corresponding MME and the initial MSC takes place. In particular, mobile user device responds to the RNC/BSC (e.g., RNC/BSC 142) with a paging response message. The paging response message includes information such as temporary mobile subscriber identity (TMSI) information.

In example call flow 200, the IuCS interface between the RNC/BSC and the initial MSC is down. According to techniques of the present disclosure, upon detection of the failed IuCS interface to the initial MSC (e.g., first MSC 122), the RNC/BSC (e.g., RNC/BSC 142) transmits the paging response message from mobile user device to a new MSC (e.g., second MSC 124) of the MSC pool (e.g., MSC pool 120). The new MSC uses NRI information in TMSI parameter to identify the initial MSC.

Optionally, the new MSC may ask for the mobile user device for its international mobile subscriber identity (IMSI) via an identity procedure. For example, the new MSC may transmit an identity request to the mobile user device and receive an identity response from the mobile user device.

Continuing with example call flow 200, the new MSC transmits a Send Identification message of the user device to the initial MSC, which responds with a Send Identification Acknowledgment message to the new MSC. The Send Identification message contains the TMSI parameter, which will be used to identify the user device by the initial MSC. The Send Identification acknowledgment contains the IMSI of the user device and optionally other parameters such as the authentication vectors that were stored on the initial MSC. At this point, an authentication procedure between the new MSC and the mobile user device takes place through the RNC/BSC. Then, the new MSC performs a location update procedure with the HLR, which is associated with the new MSC and the initial MSC, regarding the mobile user device. It is noteworthy that MTRF is supported by the new MSC and the initial MSC. In return, the HLR transmits a cancel location message to the initial MSC, which responds with a cancel location acknowledgement. At this point, the initial MSC stops paging timer with respect to the mobile terminating voice call to the mobile user device. The HLR also transmits an insert subscriber data to the MSCs of the MSC pool, including the new MSC, to which the new MSC responds with an insert subscriber data acknowledgement. At this point, the initial MSC transmits the PRN to the new MSC as the initial MSC has MTRF enabled. The HLR continues to transmit an insert subscriber data message to the new MSC, which responds with an acknowledgement. The HLR also transmits an update location acknowledgement to the new MSC to indicate that the location update with respect to the mobile user device is completed. At this point, the new MSC terminates the location update procedure. The new MSC transmits a PRN acknowledgement to the initial MSC with a new mobile station roaming number (MSRN), which responds with an IAM. Then, the new MSC transmits a setup message to the mobile user device, which responds with a call confirmation message. At this point, a normal mobile terminating call procedure between the new MSC and the mobile user device takes place.

It is noteworthy that, in example call flow 200, both the initial MSC and the new MSC support MTRF and have it enabled. The HLR may support MTRF and may have it enabled. The RNC/BSC is able to transmit the messages intended for the initial MSC to the new MSC instead in response to the IuCS interface between the RNC/BSC and the initial MSC being down. The new MSC is able to identify the other MSCs in the MSC pool based on the NRI information.

With respect to the implementation of techniques of the present disclosure, the RNC/BSC (e.g., RNC/BSC 142) is configured to forward the paging response message from the mobile user device to another MSC (e.g., new MSC such as second MSC 124) of the MSC pool in response to the IuCS interface between the RNC/BSC and the initial MSC being down. The RNC/BSC may choose an MSC from the MSC pool in a random fashion or in accordance with an algorithm, e.g., round robin. The new MSC (e.g., second MSC 124), as well as MSCs of the MSC pool (e.g., first MSC 122 and third MSC 126), is configured to refrain from discarding any unsolicited paging response message but, rather, process the paging response message instead. A new implementation may be needed on the new MSC to support the identification of other MSCs of the MSC pool based on NRI information. The new MSC is also able to limit the location update procedure to the HLR and not propagate it to the mobile user device to avoid complicating the process.

Example Telecommunications Device

Figure 3:
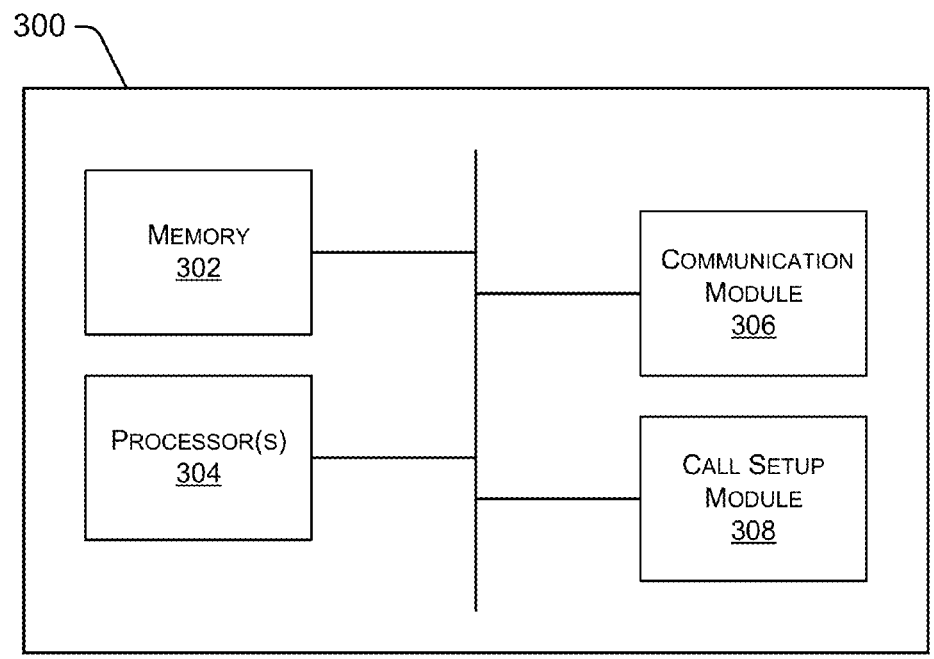
FIG. 3 illustrates a block diagram of an example telecommunications device in accordance with an embodiment of the present disclosure.

FIG. 3 illustrates a block diagram of an example telecommunications device 300 in accordance with an embodiment of the present disclosure. Example telecommunications device 300 may be, for example, second MSC 124 of FIG. 1 or the new MSC of FIG. 2. Those skilled in the art would appreciate that, in the interest of brevity and not obscuring the understanding of techniques of the present disclosure, certain components typically found in an MSC are omitted in the illustration of the example telecommunications device 300 in FIG. 3. For illustrative purposes, description of example telecommunications device 300 is provided below with reference to example mobile telecommunications network environment 100 of FIG. 1.

As shown in FIG. 3, example telecommunications device 300 (e.g., second MSC 124) includes memory 302, one or more processors 304 coupled to memory 302, and a communication module 306 coupled to the one or more processors 304. Memory 302 is configured to store at least a set of instructions. Communication module 306 is configured to communicate with other nodes in the network (e.g., first MSC 122, third MSC 126, RNC/BSC 142, etc.). The one or more processors 304 are configured to execute the set of instructions to perform a variety of operations.

The operations may include receiving a reply message from a mobile user device (e.g., mobile user device 152) forwarded to example telecommunications device 300 by a radio access device (e.g., RNC/BSC 142). The reply message may be provided by the mobile user device in response to the mobile user device receiving a request message from another telecommunications device (e.g., first MSC 122). The operations may also include the establishing a voice call for the mobile user device based at least in part on information in the reply message.

In various embodiments, the request message may include a paging request, the reply message may include a paging response, and the information in the reply message may include TMSI.

In various embodiments, the one or more processors may also identify other telecommunications devices in a pool of telecommunications devices, with which example telecommunications device 300 belongs, based on NRI information in the reply message from the mobile user device.

In various embodiments, the one or more processors may also perform a location update procedure with a HLR associated with example telecommunications device 300 regarding the mobile user device.

In various embodiments, the one or more processors may also, prior to establishing the voice call, transmit an identity request to the mobile user device and receive an identity response from the mobile user device.

Example telecommunications device 300 may optionally include a call setup module 308. Call setup module 308 may be configured to perform one or more of the above-described operations in connection with establishing a mobile terminating call in a mobile telecommunications network in accordance with an embodiment of the present disclosure. In some embodiments, call setup module 308 is an integral part of the one or more processors 304. Alternatively, call setup module 308 may be logically separate from the one or more processors 304 and configured to operate under the control of the one or more processors 304.

Example Processes

Figure 4:
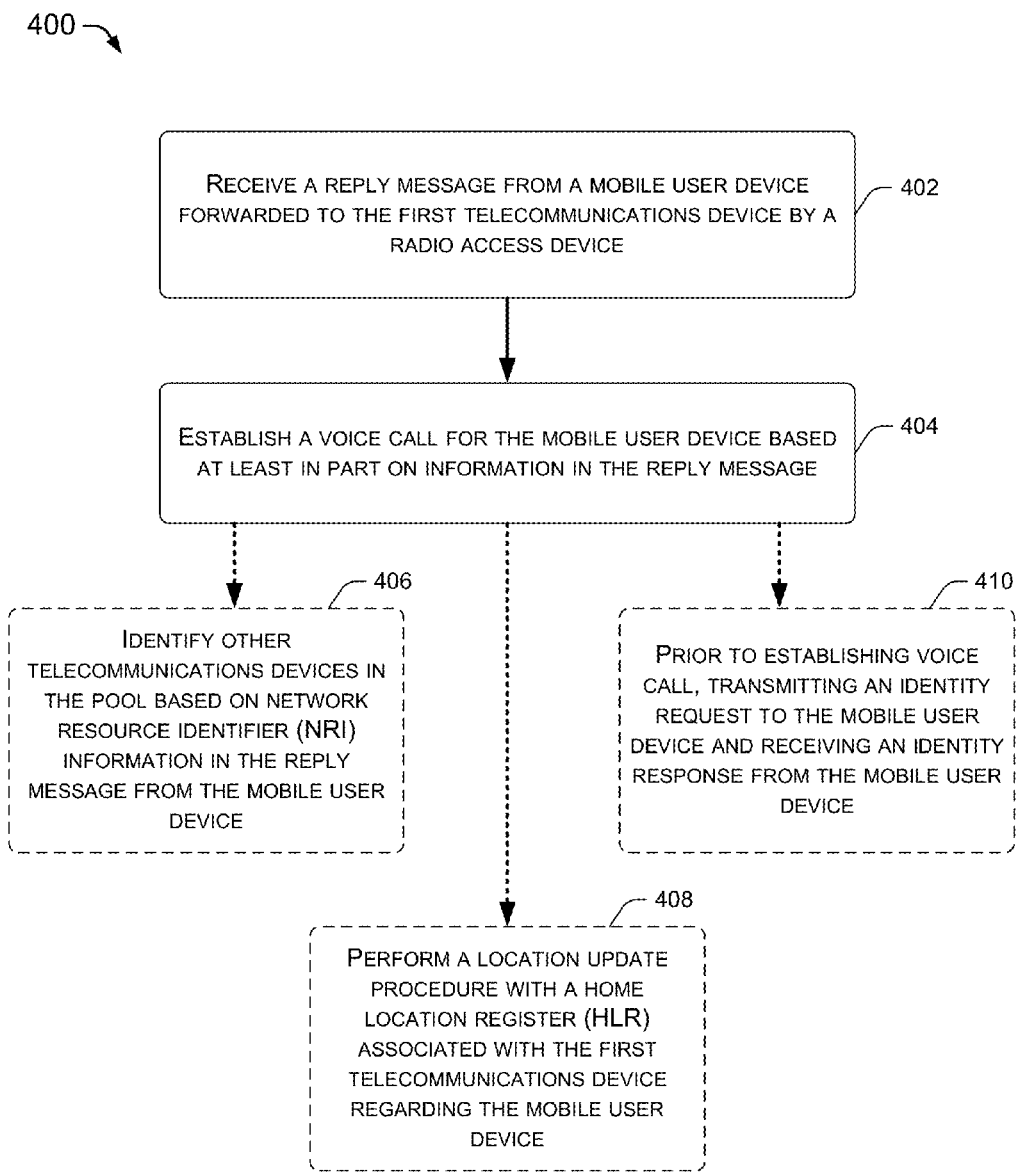
FIG. 4 illustrates a flow diagram of an example process of establishing a mobile terminating call in a mobile telecommunications network in accordance with an embodiment of the present disclosure.

FIG. 4 illustrates a flow diagram of an example process 400 of establishing a mobile terminating call in a mobile telecommunications network in accordance with an embodiment of the present disclosure. Process 400 may be implemented by second MSC 124 of FIG. 1 or the new MSC of FIG. 2. Further, process 400 may include one or more operations, actions, or functions depicted by one or more blocks 402, 404, 406, 408 and 410. Processes discusses herein are illustrated as a collection of referenced acts arranged in a logical flow graph, which represent a sequence that can be implemented in hardware, software, or a combination thereof. In the context of software, the acts represent computer-executable instructions that, when executed by one or more processors, perform the recited operations. Generally, computer-executable instructions include routines, programs, objects, components, data structures, and the like that perform particular functions or implement particular abstract data types. The order in which the acts are described is not intended to be construed as a limitation, and any number of the described acts can be combined in any order and/or in parallel to implement process 400. Process 400 may begin at 402.

At 402, a first telecommunications device (e.g., second MSC 124) of a pool of telecommunications devices (e.g., MSC pool 120) receives a reply message from a mobile user device (e.g., mobile user device 152) forwarded to the first telecommunications device by a radio access device (e.g., RNC/BSC 142). The reply message may be provided by the mobile user device in response to the mobile user device receiving a request message from a second telecommunications device (e.g., first MSC 122) of the pool of telecommunications devices.

At 404, the first telecommunications device establishes a voice call for the mobile user device based at least in part on information in the reply message.

In various embodiments, the first telecommunications device may receive the reply message from the mobile user device forwarded to the first telecommunications device by the radio access device in response to a failure in a connection between the radio access device and the second telecommunications device.

In various embodiments, the mobile user device may include a LTE-capable UE, the pool of telecommunications devices may include a pool of MSCs, and the radio access device may include a RNC of a UMTS network in the mobile telecommunications network or a BSC of a GSM network in the mobile telecommunications network. In some embodiments, the request message may include a paging request, the reply message may include a paging response, and the information in the reply message may include TMSI.

In various embodiments, the first telecommunications device and the second communications device may support MTRF in accordance with the 3GPP standards.

Optionally, at 406, process 400 may include the first telecommunications device identifying other telecommunications devices in the pool based on NRI information in the reply message from the mobile user device.

Optionally, at 408, process 400 may include the first telecommunications device performing a location update procedure with a home location register (HLR) associated with the first telecommunications device regarding the mobile user device.

Optionally, at 410, process 400 may include the first telecommunications device, prior to establishing the voice call, transmitting an identity request to the mobile user device and receiving an identity response from the mobile user device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of establishing a mobile terminating call in a mobile telecommunications network, comprising:
    detecting a failure of a connection between a radio access device and an initial telecommunications device of a pool of telecommunication devices that occurred following the radio access device sending a paging request message from the initial telecommunications device to a mobile user device;
    receiving, by a new telecommunications device of a pool of telecommunications devices, a reply message from a mobile user device forwarded to the new telecommunications device by the radio access device after a detection of the failure in the connection between the radio access device and the initial telecommunications device that occurred following the radio access device sending the paging request message from the initial telecommunications device to the mobile user device, the reply message provided by the mobile user device in response to the mobile user device receiving the paging request message from the initial telecommunications device; and
    establishing a voice call, by the new telecommunications device, for the mobile user device based at least in part on information in the reply message.

2. The method of claim 1, wherein the mobile user device comprises a Long Term Evolution (LTE) capable user equipment, wherein the pool of telecommunications devices comprises a pool of mobile switching centers (MSCs), and wherein the radio access device comprises a radio network controller (RNC) of a Universal Mobile Telecommunications System (UMTS) network in the mobile telecommunications network or a base station controller (BSC) of a Global System for Mobile Communications (GSM) network in the mobile telecommunications network.

3. The method of claim 2, wherein the request message comprises a paging request, wherein the reply message comprises a paging response, and wherein the information in the reply message comprises temporary mobile subscriber identity (TMSI).

4. The method of claim 1, wherein the new telecommunications device and the initial telecommunications device support a $3^{rd}$ Generation Partnership Project (3GPP) mobile terminating roaming forwarding (MTRF) feature.

5. The method of claim 1, further comprising:
    identifying, by the new telecommunications device, other telecommunications devices in the pool based on network resource identifier (NRI) information in the reply message from the mobile user device.

6. The method of claim 1, further comprising:
    performing, by the new telecommunications device, a location update procedure with a home location register (HLR) associated with the new telecommunications device regarding the mobile user device.

7. The method of claim 1, further comprising:
    prior to establishing the voice call:
    transmitting an identity request to the mobile user device; and
    receiving an identity response from the mobile user device.

8. The method of claim 1, wherein, following the detection of the failure in the connection between the radio access device and the initial telecommunications device, the new telecommunications device is selected from the pool of telecommunications devices by the radio access device to receive the reply message from the mobile user device.

9. A mobile telecommunications network, comprising:
    a Long Term Evolution (LTE) network;
    a pool of multiple mobile switching centers (MSCs); and
    a radio access device communicatively coupled to at least a first MSC and a second MSC of the pool of MSCs,
    wherein, in response to a failure in a connection between the radio access device and the second MSC that occurred following the radio access device sending a paging request message for a voice call from the second MSC to a mobile user device, the radio access device is configured to forward to the first MSC a reply message from a mobile user device that is in reply to the paging request message from the second MSC, and
    wherein the first MSC is configured to receive the reply message and establish the voice call for the mobile user device based at least in part on information in the reply message.

10. The mobile telecommunications network of claim 9, wherein the radio access device comprises a radio network controller (RNC) of a Universal Mobile Telecommunications System (UMTS) network in the mobile telecommunications network or a base station controller (BSC) of a Global System for Mobile Communications (GSM) network in the mobile telecommunications network.

11. The mobile telecommunications network of claim 9, wherein the reply message comprises a paging response, and wherein the information in the reply message comprises temporary mobile subscriber identity (TMSI).

12. The mobile telecommunications network of claim 9, wherein the first MSC and the second MSC support a $3^{rd}$ Generation Partnership Project (3GPP) mobile terminating roaming forwarding (MTRF) feature.

13. The mobile telecommunications network of claim 9, wherein the first MSC is further configured to perform operations comprising:
  identifying other MSCs in the pool based on network resource identifier (NRI) information in the reply message from the mobile user device.

14. The mobile telecommunications network of claim 9, wherein the first MSC is further configured to perform operations comprising:
  performing a location update procedure with a home location register (HLR) associated with the first MSC regarding the mobile user device.

15. The mobile telecommunications network of claim 9, wherein the first MSC is further configured to perform operations comprising:
  prior to establishing the voice call:
  transmitting an identity request to the mobile user device; and
  receiving an identity response from the mobile user device.

16. A telecommunications device, comprising:
  memory configured to store at least a set of instructions; and
  one or more processors coupled to the memory, the one or more processors configured to execute the set of instructions to perform operations comprising:
    detecting a failure of a connection between a radio access device and an initial telecommunications device of a pool of telecommunication devices that occurred following the radio access device sending a paging request message from the initial telecommunications device to a mobile user device;
    receiving a reply message from a mobile user device forwarded to the telecommunications device by a radio access device after the detection of the failure in the connection between the radio access device and an initial telecommunications device that occurred following the radio access device sending the paging request message from the initial telecommunications device to the mobile user device, the reply message provided by the mobile user device in response to the mobile user device receiving the page request message from the initial telecommunications device; and
    establishing a voice call for the mobile user device that is routed through the telecommunications device based at least in part on information in the reply message.

17. The telecommunications device of claim 16, wherein the reply message comprises a paging response, and wherein the information in the reply message comprises temporary mobile subscriber identity (TMSI).

18. The telecommunications device of claim 16, wherein the one or more processors are further configured to perform operations comprising:
  identifying other telecommunications devices in a pool of telecommunications devices, with which the telecommunications device belongs, based on network resource identifier (NRI) information in the reply message from the mobile user device.

19. The telecommunications device of claim 16, wherein the one or more processors are further configured to perform operations comprising:
  performing a location update procedure with a home location register (HLR) associated with the telecommunications device regarding the mobile user device.

20. The telecommunications device of claim 16, wherein the one or more processors are further configured to perform operations comprising:
  prior to establishing the voice call:
  transmitting an identity request to the mobile user device; and
  receiving an identity response from the mobile user device.

* * * * *